United States Patent [19]

Slocum

[11] Patent Number: 4,836,042
[45] Date of Patent: Jun. 6, 1989

[54] SYSTEM TO CONVERT ROTARY MOTION TO LINEAR MOTION

[75] Inventor: Alexander H. Slocum, McLean, Va.

[73] Assignee: Advanced Engineering Systems, Operations & Products, Inc., Concord, N.H.

[21] Appl. No.: 77,804

[22] Filed: Jul. 27, 1987

[51] Int. Cl.$^4$ ............................................. F16H 25/24
[52] U.S. Cl. ................................. 74/424.8 R; 74/459; 74/468; 384/123
[58] Field of Search ............... 74/89.15, 424.8 R, 459, 74/468; 384/123

[56] References Cited

U.S. PATENT DOCUMENTS

| | | | |
|---|---|---|---|
| 2,320,353 | 6/1943 | Ernst et al. | 74/424.8 R |
| 3,171,295 | 3/1965 | Benckert | 74/424.8 R |
| 3,183,732 | 5/1965 | Porath | 74/424.8 R |
| 3,448,632 | 6/1969 | Rumbarger | 74/424.8 R |
| 3,670,583 | 6/1972 | Leming | 74/89.15 |
| 4,566,345 | 1/1986 | Erikson | 74/89.15 |

FOREIGN PATENT DOCUMENTS

| | | | |
|---|---|---|---|
| 1550774 | 10/1969 | Fed. Rep. of Germany | 74/424.8 R |
| 58-166161 | 10/1983 | Japan | 74/424.8 R |
| 58-166162 | 10/1983 | Japan | 74/424.8 R |
| 914165 | 12/1962 | United Kingdom | 74/468 |
| 1239557 | 7/1971 | United Kingdom | 74/89.15 |

Primary Examiner—Allan D. Herrmann
Attorney, Agent, or Firm—Rines and Rines

[57] ABSTRACT

In a system that includes a linearly movable carriage or the like, a mechanism to convert rotary motion of a leadscrew to linear motion of a nut and, hence, linear movement of the carriage to which the nut is mechanically secured. The leadscrew has a special threadform and the nut has a special threadform that matches the threadform of the leadscrew with a pressurized fluid interface therebetween, there being both axial clearance and radial clearance sufficient to accommodate angular and lateral misalignment between the leadscrew and the carriage. Shallow independent grooves or passages are distributed along the length nut's helical threadform to equalize air pressure therealong and orifices are provided to the grooves or passages to permit introduction of high pressure air or other fluid thereto. Exhausts are provided from the region of clearance between the leadscrew threadform and the nut threadform. Both threadforms are ideally in the form of square threads.

19 Claims, 3 Drawing Sheets

SYSTEM TO CONVERT ROTARY MOTION TO LINEAR MOTION

The present invention relates to mechanisms to convert rotary motion to linear motion.

There is disclosed herein a system that includes a nut to convert rotary motion from a leadscrew to linear motion by way of a special threadform which utilizes air or oil (or some other fluid) as an interface between the threads of the nut and the threads of the leadscrew whereby, among aother things, the nut is floated to damp out mechanical noise. The special threadforms of the leadscrew and the nut, when supplied with high pressure gas, provide a mechanism for the nut very efficiently to convert the rotary power of the leadscrew to linear power. The use of a gas or fluid as an interface between the threadforms eliminates friction and results in almost 100% power conversion efficiency. The high pressure gas or fluid interface between the threadforms also acts to preload the nut thereby eliminating backlash between the leadscrew and nut. The special thread design, furthermore, enables the nut to act as a coupling between itself and a movable carriage such that only forces along an axis parallel to the axis of the leadscrew are transmitted from the nut to the carriage. Simultaneously, potential misalignment forces and moments, along and about the other two axes that are orthogonal to the leadscrew axis are not generated or transmitted as a result of misalignment of the leadscrew axis with the axis of the movable carriage.

The principle of a leadscrew and accompanying nut has been used for centuries to provide a means for transmitting rotary motion into linear motion. By turning a leadscrew and holding a nut so it does not rotate, the nut moves along the length of the leadscrew. The introduction and the continued sucess of the leadscrew driven by a rotary power source to provide linear motion is due to the fundamental fact that rotary motion motors are easier to produce and are more efficieny than linear motion motors.

The first known application of a leadscrew thread to do useful work was Archimedes' leadscrew pump which converted rotary power of a leadscrew into an elevator for raising water from a river to an irrigation ditch. The first leadscrew cutting lathes were introduced in the fifteenth century and were used to manufacture wooden screws. Screwthreads could be increased in accuracy with hand finishing and it was just a matter of time before they developed into useful tools for metal working.

It was found that even though leadscrews were prone to manufacturing errors, the effect of many threads in the nut trying to engage the leadscrew simultaneously caused some of the errors to average out. Thus, by snugly fitting a nut to a leadscrew and wearing it in, the accruacy to which leadscrews could be manufactured steadily increased. As early as 1800, Henry Maudslay was credited with developing a leadscrew with 100 threads per inch and an accruacy of 0.001 inches. In 1855, Joseph Whitworth developed a leadscrew driven machine that could compare differences in the size of parts to within one millionth of an inch.

Leadscrews worked well, but they were subject to friction and wear. Since the workspace of machines were not used equally, wear was not easily compensated. The wear was attributed to the sliding contact between the threads of the leadscrew and the nut. With the advent of advanced grinding machines for internal surfaces, the ballscrew was born. The threadform of the leadscrew and nut was made in an arched form, and contact between the leadscrew and the nut was made through ball bearings. The ballnut has a recirculating tube attached to the end of the threadform which carries the balls back to the beginning of the thread. By introducing rolling elements between the threads, greater life could be achieved. Today, the ballscrew is the most common forms of leadscrew used in the design of industrial machinery. It can be used to achieve accuracies on the order of 50 microinches per inch. Ballscrews, however, still are subject to wear.

It is difficult to grind internal threads of a nut with the same accuracy as external threads of a leadscrew. This is one of the factors which contributes to wear in ballscrews. The rollerscrew has a nut built from three or more small sections of a leadscrew held in a circle with their threads engaging the lead of a long leadscrew. The small leadscrews are held by bearing journals and are allowed to rotate, thus reducing friction while still converting rotary motion of the leadscrew into linear motion of the nut. Rollerscrews can be manufactured with accuracies on the order of 20 microinches per inch.

Today, the state of the art in leadscrew manufacturing is best represented by the Moore master leadscrew (manufactured by Moore Special Tool of Bridgeport, Connecticut) which can be hand finished to achieve an accuracy on the order of 10 millionths of an inch over a range of travel of eighteen inches. The Moore master leadscrew is finished with such great care and precision, that even though the threadform of the leadscrew and nut are in direct contact, they last many times longer than the finest ball or roller leadscrew. Moore Master leadscrews, however, are very expensive and are limited in supply as replacement parts for Moore machines.

The mechanical advantage provided by a leadscrew is a function of the lead and efficiency. The lead l of the leadscrew thread is defined as the linear distance the nut travels in one turn of the leadscrew:

$$X = l\theta \tag{1}$$

The rotary power into the system is the product of the torque $\Gamma$ and one revolution $\Theta$. It equals the linear power out. From this relation, the force generated by the torque from the motor as it is converted with an efficiency $\eta$ into linear motion by the leadscrew and nut can be found:

$$F = \frac{2\pi \Gamma \eta}{l} \tag{2}$$

The finer the lead, the less effect an angular perturbation has on the distance traveled. Linear and rotary stiffnesses are defined in the form of:

$$F_L = K_L X \tag{3}$$

$$F_R = K_R \Theta \tag{4}$$

The equivalent linear stiffness of a rotary motor reflected through a leadscrew into a linear system is:

$$K_{Linear\ equivalent} = \frac{2\pi K_{rotary}}{l^2} \tag{5}$$

The leadscrew and nut can increase the apparent stiffness of an electric motor. The stiffer the drive system, the higher the natural frequency of the machine. Machines which have low drive train natural frequencies tend to "chatter" and leave marks on the surface being machined. The stiffness of a motor is proportional to the magnetic field strength that can be maintained. The strength of the magnetic field is in turn governed by the type of magnets that are available.

It is anticipated that linear motor technology will advance to the point where linear motors will be as stiff as present rotary motor leadscrew combinations. Linear motors are more easily coupled to a linearly movable carriage without imposing loads due to misalignment on the carriage. However, the same magnet technology that may be developed to give future linear motors high performance levels could also be used to give higher performance for rotary motors. Thus, if a leadscrew and nut could be designed that was not subject to wear or alignment errors, it could be used with future rotary motors to economically outperform linear motors.

Attention is called to letters patent 4,586,394 of Perkins, which describes an attempt to design a leadscrew and nut with an air bearing interface. The biggest error made in the technology described in the patent was that it was assumed that by merely forcing high pressure air into the region between conventional threads without addressing the issue of the shape of the thread or where the air should be injected, that a leadscrew system lubricated by air would be attained. For example, Perkins states that, "As shown in FIG. 2, each group of holes such as 35, includes six holes 41-46, that are circumferentially spaced about the axes of the nut and lead screw, so that the pressured gas is applied relatively uniformly around the clearance space 20. The pneumatic centering system can operate by increasing the pressure on one side of the nut when that side approaches the leadscrew." This is exactly what is not desirable in a precision leadscrew. A leadscrew ideally is only stiff in the axial direction, the bearing carriage that the leadscrew moves is supposed to hold the nut in the radial direction. Providing stiffness in the radial direction only introduces errors caused by misalignment of the leadscrew and bearing carriage it moves. Perkins does not teach how to provide high axial stiffness. In the invention report issued by the Jet Propulsion Laboratory, Perkins describes a Vespel nut (plastic) fitted to a metal leadscrew. He describes a successful experiment: air was applied and the friction went away. However, he does not describe the effect that an axial force would have. Since his orifices are arranged at the root of the threads, as the threads are jammed in one direction due to an axial load, the air will merely escape out the opposite direction which has had its gap increased. This is exactly contrary to the manner in which an air bearing is supposed to work. His claims and description are valid with respect to describing apparatus that keeps a leadscrew centered inside a nut, but not with respect to providing a leadscrew with high axial stiffness, zero friction, and absolute compliance along and about all other axes other than the axis parallel to the length of the leadscrew.

Even as accuracy of a leadscrew is increased, a method must also be found for precisely aligning the leadscrew with the device to which it is mounted. If misaligned, forced geometric congruence between the leadscrew and the driven axis creates lateral forces in the leadscrew which increases wear. The more accurate the leadscrew, the more accurate the alignment required, the latter being accomplished by skilled craftsmen.

Accordingly it is an objective of the present invention to provide a mechanism to convert rotary power from a shaft to linear power in a linearly movable carriage without power losses due to friction between the shaft and the element used to convert the power.

Another objective is to accomplish rotary to linear power transmission with mechanical motion smoothness and accuracy on the order of microinches while using components which themselves have only been manufactured with a tolerance on the order of hundreds of microinches.

Another objective is to accomplish rotary to linear power transmission with the axial stiffness of the mechanism equal to or greater than the axial stiffness of any other component in the system, such as the leadscrew shaft.

A further objective is to provide a mechanism to accomplish the preceding objectives while acting as its own coupling between the nut and movable carriage such that only forces along an axis parallel to the axis of the leadscrew are transmitted from the nut to the carriage, while potenial misalignment forces and moments along and about the other two axes that are orthogonal ot the leadscrew axis are not generated or transmitted as a result of misalignment of the leadscrew axis with the axis of the movable carriage.

These and still further objectives are addressed hereinafter.

The foregoing objectives are attained, generally, in a mechanism to convert rotary power from a leadscrew to linear motion by way of a special threadform which utilizes air (or some other fluid) as an interface between a special threadform of a leadscrew and the special threadform of an associated nut. The special threadforms when supplied with high pressure gas or other fluid and incorporated into the design of a leadscrew and nut provide a way for the nut to convert the rotary power of the leadscrew to linear power, for powering a linear movable slide, without losing any power in the form of friction between the threadforms of the leadscrew and the nut. The mechanism furthermore uses the high pressure gas or fluid interface between the threadforms to preload the nut thereby eliminating backlash between the leadscrew and nut. The mechanism also acts as its own coupling between the nut and a linearly movable carriage such that only forces along an axis parallel to the axis of the leadscrew are transmitted from the nut to the carriage, while potential misalignment forces and moments, along and about the other two axes that are orthogonal to the leadscrew axis are not generated or transmitted as a result of misalignment of the leadscrew axis with the axis of the movable carriage.

In this system the leadscrew rotates about its axis to effect parallel linear movement therealong of the nut, the cooperative threadforms of the leadscrew and nut being shaped to provide for a small degree of pitch and yaw and relative radial movement of the nut out of parallelity with the leadscrew; a way is provided continuously supplying pressurized fluid between the cooperative threads of the leadscrew and nut, and a way is provided for controlling the fluid pressure continuously to provide high axial stiffness with substantially zero stiffness in yaw, pitch, rotation and radial motion while inhibiting mechanical contact between the cooperative threads, thereby to maintain the linear movement of the nut parallel to the leadscrew axis.

Frictionless motion between surfaces is required to prevent wear. Some types of leadscrews and nuts strive to achieve frictionless operation by forcing high pressure lubricating oil into the threads of a conventional nut. This is referred to as a hydrostatic nut. The use of a continuous flow of oil helps to reduce friction and control thermal expansion of the nut. This type of technology, however, seeks to control wear between the thread surfaces of the nut and leadscrew by forcing oil between conventional threadforms. No attempt has been made to optimize the threadform and pressure supply lines to achieve true hydrostatic support. Such hydrostatic nuts are not suitable for the clean room types of enviornments where high precision leadscrews are often used. Thus, although the invention described herein can be turned for use with a gas or fluid, only the gas interfaced nut (based on aerostatic bearing design principals) described herein could be used in an ultra precision application.

Aerostatic bearings operate on the same principle as hydrostatic bearings, however, air is not viscous enough to act as a lubricant if it were to be merely pumped into a conventional nut the way some hydrostatic bearings are used. The air must be forced into a gap between two surfaces through an orifice from a reservoir. Ideally, an air bearing is composed of two opposing bearings such that when a load is applied, the gap across one bearing decreases while the gap across the second bearing increases. The pressure in the bearing with the decreasing gap increases while the pressure in the bearing with the increasing gap decreases to create a pressure differential. The pressure differential acts to force the supported structure back in the direction of increasing gap. The orifices and reservoir thus serve the purpose of preventing the supply of air from escaping unrestricted through the bearing with the increasing gap.

As mentioned previously, attempts have been made to eliminate friction and increase accruacy in leadscrews by pumping oil into conventional nuts; however, these attempts were not successful because the proper shape threadform and fluid distribution channels were never achieved. Also, oil is too messy for use in precision clean room environments.

To date, no one has developed a leadscrew and nut combination that utilizes air as a lubricant between the threads of the leadscrew and the nut. The principal problem has been in developing the correct threadform to attain reasonable stiffness and load carrying capability, and a procedure to manufacture the threadform. This invention addresses each of these issues.

The invention is described hereinafter with reference to the accompanying drawing in which.

Figure 1:
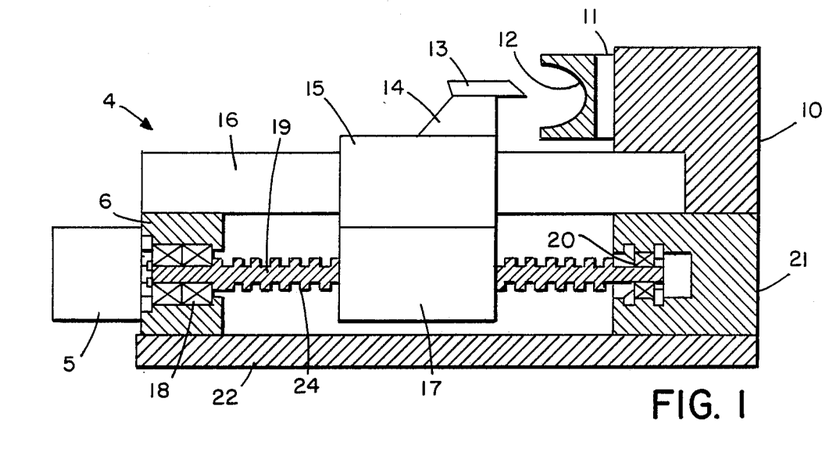
FIG. 1 is a schematic cutaway view of a machine that utilizes a leadscrew and nut to move a linear slide to which a tool is attached for machining a part.

The drawing shows a mechanism or system that is operative to convert rotary power from a leadscrew to linear motion of a nut by means of special threadforms which utilize air (or other fluid) as an interface between the special threadforms of the leadscrew and the nut. As shown in FIG. 1, the mechanism is used to operate a machine or system 4 which is composed of a tail 6, a bed 22, a head 21, a headstock 10, a spindle 11, a part 12 held to the spindle, a tool 13 held by a toolpost 14 that is anchored to a linearly movable carriage 15 that is supported by a linear bearing 16. A motor 5 turns a leadscrew 19 with the special threadform 24 ground into its length, as later discussed in detail. A nut 17 mates with the leadscrew 19 and converts rotary power to linear power to move the carriage 15 and the tool 13 for cutting a contour into the part 12, with very high efficiency and zero backlash or wear between the leadscrew 19 and the nut 17. The leadscrew 19 and mating aperture within the nut 17 are, of course, circular-cylindrical in shape and cross dimensions. In the leadscrew and nut system shown, rotation of the leadscrew about its axis effects parallel linear movement of the nut therealong, the cooperative threadforms of the leadscrew and nut being shaped to provide for small degree of pitch, yaw, as well as small relative radical movement of the nut out of parallelity with the leadscrew.

Figure 2:
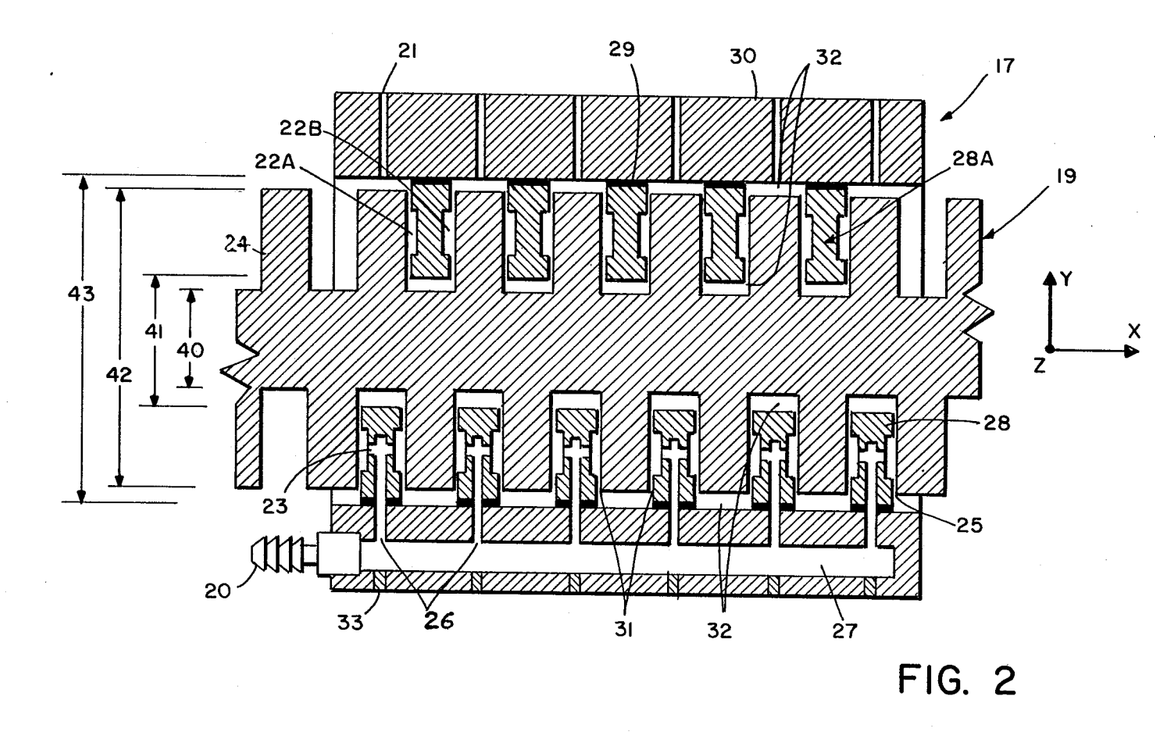
FIG. 2 is a cross section schematic showing a portion of a special threadforms of both the leadscrew and the nut in FIG. 1 which allows air to be used as a very stiff interface between the threadforms.
Figure 3:
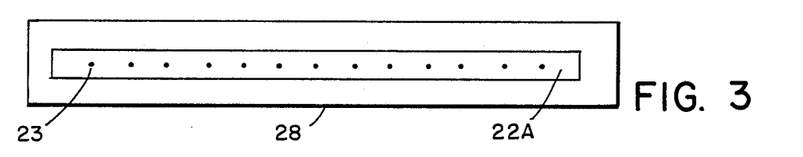
FIG. 3 is a schematic view of the threadform of the nut in FIG. 2 as it would look if the helical threadform were stretched out linearly.
Figure 4:
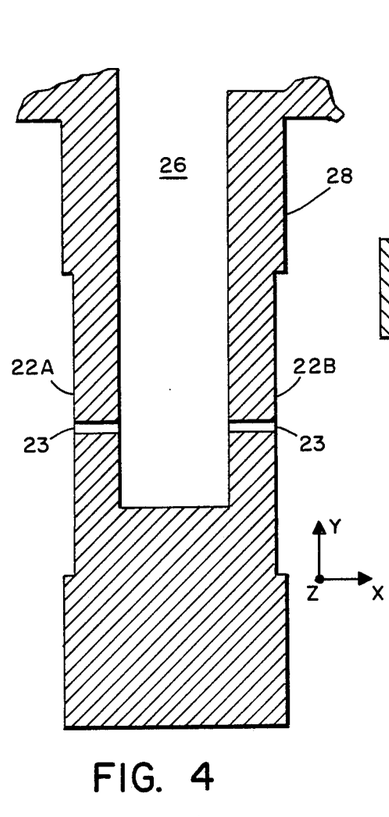
FIG. 4 is a cross section view of the threadform on the nut in earlier figures, showing air supply passages, pockets and orifices.

To accomplish the conversion of power with high efficiency and zero backlash or wear between the nut 17 and the leadscrew 19, a special threadform is needed, as discussed herein. As shown in FIG. 2, an inner core 28A, containing the special threadform 28, is fastened to an outer core 30 by means of a bonding mechanism such as an adhesive 29 (or shrink fit techniques may be employed). The threadform 28 mates with the threadform 24 of the leadscrew 19 such that sufficient axial clearance 31 is provided between the nut and leadscrew threadforms to allow a cushion of high pressure air to act as an interface between them. The clearance 31 must also be sufficient to allow for rocking motion of the nut 17 about the Y and Z axes by an amount equal to the expected angular misalignment of the leadscrew 19 with the linearly moveable carriage 15.

In addition, radial clearance 32 is provided between the threadform 28 of the nut 17 and the threadform 24 of the leadscrew 19 to allow for radical motion of the nut in the Y and Z directions by an amount equal to the expected lateral (radial) misalignment of the leadscrew 19 with the linearly movable carriage 15, and to allow high pressure air escaping from the clearances 31 between the nut and leadscrew threadforms to easily exhaust to the atomophere.

The threadforms 28 of the nut also contains shallow radially-elongate grooves 22A and 22B (shown greatly enlarged) to distribute and equalize air pressure along the length (i.e., radial dimension) of each respective side of the teeth of the nut threadform 28. These grooves extend continuously in a helical fashion along the entire helix of each side of the nut's threadform 28, but are capped at the ends of the helix to prevent loss of the pressurized air. Orifices such as 23 (shown greatly enlarged) from air passages or holes 26 are placed along the length of the grooves 22A and 22B to provide high pressure air along the entire helical length of the grooves and to the clearence 31 between the leadscrew and nut threadforms. The air supply holes, 21, extend radially inwardly from a larger air plenum or reservoir 27 to intersect with the orifices and serve to supply high pressure air to them and hence to the grooves 22A and 22B. Air (or other suitable gas) is supplied to the plenum 27 by a nozzle 20. Radial exhaust holes such as 21 are drilled about the circumference of the nut 17 to help exhaust air that may otherwise build up in the radial clearance space 32 between the leadscrew and nut threadforms.

In order to successfully implement this design, it is necessary to provide a passage for the air to flow once it leaves the bearing, which is necessary to allow a pressure differential to form between the two sides of the nut threadform 28 in order to act as a restoring force. This is accomplished by making the root diameter 40 (minimum outside diameter) of the threadform 24 on the leadscrew less than the peak diameter 41 (minimum inside diameter) of the threadform 28 of the nut. Similarly, the maximum outside diameter 42 of the leadscrew thread 24 is less than the maximum inside diameter 43 of the nut. Typically, the difference in diameters should be on the order of 0.1–0.2 of the height of the thread. Freedom for the air to flow is also accomplished, as above noted, by drilling radial holes 21 in the nut to intersect the radial gap region 32.

The second consideration is to allow the nut to function as its own coupling between itself and the movable carriage 15, such that only forces along the X axis are transmitted from the nut to the carriage, while forces and moments along and about the Y and Z axes (e.g., yaw and pitch) that could be generated or transmitted as a result of misalignment of the leadscrew axis with the axis of the movable carriage, are not generated or transmitted therebetween. If the teeth that form the threadforms of the leadscrew and nut have uniform cross sections, that is, the axial thickness at the root of each tooth substantially equals the thickness at the peak, then the nut will be able to move radially. Radial motion is also premitted by the aforementioned difference in minimum and maximum diameters 40 and 41, and 42 and 43 of the leadscrew and nut respectively. The threadforms 24 and 28 have uniform cross sections. Thus the vertical threadform allows two of the required four degrees of freedom for coupling action. This means, however, that the leadscrew and the nut will not function unless the leadscrew 19 is anchored at both ends in bearings 18 and 20 and the nut 17 is rigidly attached to a linearly movable slide 15 that is supported by a bearing 16 that allows for motion only along the X asis.

The remaining two degrees of freedom required are those that prevent moments from being transmitted about axes that are orthogonal to the axis of the leadscrew (i.e., the Y and Z axes). If the air bearing interface were constructed only with orifices and independent recesses along the length of the thread helix, then the nut would transmit the undersirable moments. If, however, the recess on each side of the threadform are connected together (but not to the recesses on opposite sides of the thread) to form a long helical groove that runs the length of the thread helix on the nut (but just shy of the ends of the helix), then the pressure along one side of the thread will be constant throughout. As the nut is rotated about the Y or Z axis, the gap, for example, between the left side of the thread on the upper side of the leadscrew opens while the gap on the left side of the thread on the lower side of the leadscrew closes. Usually, this would result in a correcting force couple caused by a pressure differential resulting from one gap opening and one gap closing; however, if a pressure equalizing groove such as 22A which connects the recesses is cut into the threadform to connect all the recesses fed by the orivices, then the pressure will equalize and no force couple will be generated. An analogous situation exists for the right side of the thread. Thus the pressure equalizing grooves 22A and 22B act to prevent the bearing with the required remaining two small degrees of freedom from transmitting moments about the Y and Z axes between the nut and carriage. The groove 22A and 22B, as above noted, are radially-elongate depressions at each side of each tooth forming the nut threadform 28 and each groove is disposed along a helical path that extends axially along the nut threadform 28.

These pressure equalizing grooves also act to allow the use of non rectangular threadforms such as Acme or triangular, while still allowing the nut to move radially. Use of a non rectangular threadform may be desirable in some special cases as they may be easier to grind. The shape of the threadform will determine how much radial error motion can be tolerated before mechanical contact is made between threads.

In order to manufacture the threadform 24 of the leadscrew 19, conventional threadgrinding techniques can be used, even though the thread has a large depth to width ratio. In most cases, the nut 17 cannot be manufactured from a single piece of material because the threadform 28 of the nut assembly 17 has too large a depth to width ratio. This prevents a grinding wheel from being fitted inside the nut to grind the inside diameter thread.

Figure 5:
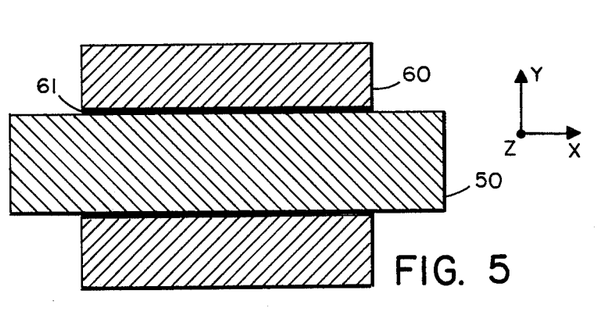
FIG. 5 is a cross section view of a mandrel and a nut blank epoxied to the mandrel prior to the special threadform process used to form the threadform.
Figure 6:
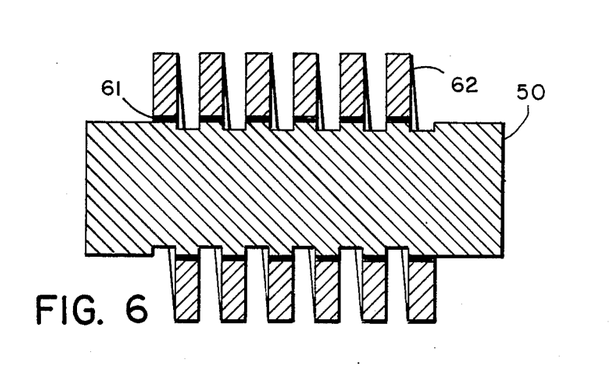
FIG. 6 is a cross section view of the nut threadform after it has been ground into the blank, and before it has been epoxied into the nut core to form the complete nut.
Figure 7:
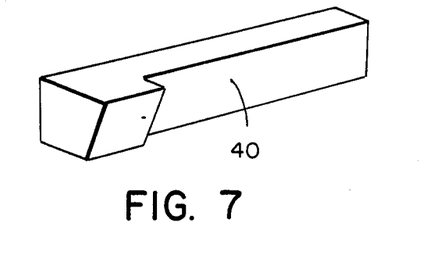
FIG. 7 is a schematic isometric of a type of tool that can be used to machine air distribution grooves after the threadform has been ground into the blank.

To remedy this problem and allow the thread forms of the nut and leadscrew to be precisely matched, a stress relieved nut thread blank 60 is epoxied at 61 (or shrunk fit) onto a mandrel 50 in FIG. 5. The mandrel can then be held in the same machine used to grind the thread in the leadscrew. The finished form of the nut thread is labeled 62 in FIG. 6. Once the threadform 62 is ground, the grooves 22A and 22B are machined using a tool 40 in FIG. 7. Care must be taken in machining the grooves 22A and 22B as they are often only a thousandth of an inch deep. Similarly, the orificies such as 23 are often only a few thousandths of an inch in diameter. Thus it would seem to be next to impossible to machine drill the orifice holes near the center portion of the nut. If the orifices are made before the threadform is fixed into the core 30, a laser or electron beam can be used to drill all orifices simultaneously, if they are aligned axially, or if there are a large number of threads, the beam can be directed at an angle from the outside diameter of the threadform. It is important, however, to drill the radial air supply holes 26 before the orifices 23 are formed, otherwise the drilling action of the air supply hole may smear closed the orifice holes. Chemical deburring means would prove useful in removing burrs from the parts.

After the grooves, air supply holes, and orifices are made in the threadform 62, it is removed from the mandrel 50 and becomes the threadform 28 which can be epoxied at 29 in FIG. 2 or shrunk fit into the inside diameter of the core 30, as before noted. The angular position of the air supply holes must be marked so the air supply holes can be drilled through the core and its plenum 27 to link up with the air supply holes 26 in the threadform 28. Plugs such as 33 are pressed into the radial holes to seal them.

The nut can now be placed on the leadscrew while high pressure air is supplied. The nut does not have any radial support from the leadscrew, thus care must be taken in handling the assembly when it is installed into the machine 4.

For purposes of analyzing the achievable stiffness of the leadscrew and nut, it can be assumed that an air bearing with properly sized reservoir, orifices, and bearing area can conservatively achieve a load rating equal to the product of one half the projected area of the bearing with the maximum pressure in the reservoir. If incorporated into a nut 17 with N turns of thread 28 and overlapping region between the thread of the leadscrew and nut of radii $R_o$ and $R_i$, respectively, the maximum axial force, $F_{axial\ max}$, the air bearing nut can support when supplied with air pressure P without making mechanical contact with the leadscrew is on the order of:

$$F_{axial\ max} \simeq \frac{PN\pi(R_o^2 - R_i^2)}{2} \tag{6}$$

A conservative estimate for the apparent stiffness of the air bearing is the load divided by one half of the equilibrium gap $\delta_A$ between the threads:

$$K_{air} \simeq \frac{PN\pi(R_o^2 - R_i^2)}{4\delta_A} \tag{7}$$

The stiffness of the threadform itself also has to be considered. Since the depth of the thread may be on the order of several times its width, t, shear as well as bending deformations must be considered. A conservative assumption is to assume that the width of an equivalent "beam" is equal to the length of the helix made by the thread, but that the helix form itself does not contribute to the stiffness of the "beam". The combined bending and shear stiffness $K_{thread}$ of the threads is:

$$K_{thread} = \frac{15EIAG}{5AGL^3 + 18LEI} \tag{8}$$

where A is the area of the thread along its length, I is the second moment of the area, G and E are the shear and Young's modulus respectively, and L is the helical length of the thread. Furthermore, let it be assumed that the equivalent of the distributed load applied by the pressurized air is a line force applied along the length of the helix at the midpoint of the threads height. The area, second moment of the beam cross section, and length of the beam are thus given by:

$$A = N\pi(R_i + R_o)t \tag{9}$$

$$I = \frac{N\pi(R_i + R_o)t^3}{12} \tag{10}$$

$$L = \frac{R_o - R_i}{2} \tag{11}$$

where t is the width of the thread, often equal to the pitch. Substituting these values into expression (8) gives the stiffness of the nut threads as a function of their physical dimensions and material properties (E and G are the Young's and shear modulii of the material the nut is made of respectively). The leadscrew threads also deform by an equal amount, thus the combined thread stiffness is:

$$K_{thread} = \frac{5EN\pi(R_o + R_i)t^3G}{(R_o - R_i)[5G(R_o - R_i)^2 + 6Et^2]} \tag{12}$$

The stiffness of the leadscrew shaft is most often the "soft" link in a leadscrew/nut system. Assuming that the helix form of the thread does not contribute to the stiffness of the shaft, the stiffness of the shaft is given by:

$$K_{shaft} = \frac{\pi R_i^2 E}{L} \tag{13}$$

The total stiffness (K total) of the assembly is a function of all the component stiffness laid end to end which is given by the inverse sum of the inverse of the component stiffness:

$$K_{total} = \frac{1}{\frac{1}{K_{shaft}} + \frac{1}{K_{thread}} + \frac{1}{K_{air}}} \tag{14}$$

Ideally, the stiffness of the shaft will always be the lowest in the system.

As an example, consider the case where the following dimensions and values are assumed:
t = 0.188 inches
$R_o$ = 1.0 inches
P = 100 psi
$R_i$ = 0.5 inches
L = 20 inches E = 29 × 10⁶ psi G = 11 × 10⁶ psi
$\delta_A$ = 0.0002 inch Then:
$K_{shaft}$ = 1,138,826 lb/inch
$K_{thread}$ = 5,019437.63N lb/inch
$K_{air}$ = 294,524N lb/inch If N is only four threads, then the nut will be as stiff as the leadscrew with one million pounds per inch. Typically, the nut will be on the order of three inches long which will accommodate four threads. Thus the nut can easily be twice as stiff as the leadscrew. This gives a stiffness almost twenty times that of a comparable rollerscrew or ballscrew equipped with a flexible coupling system to compensate for radial yaw and pitch errors. Also typically the depth of the thread will be on the order of half the radius of the leadscrew.

The above analysis has shown that a reasonable size thread and lead can be designed for the system.

It will be appreciated on the basis of the foregoing explanation that other ways can be found to exhaust or vent air from between the leadscrew threadforms and the nut threadforms. For example, the threadform can be formed of a porous material that allows proper air flow rates to occur between the leadscrew threadform and the nut threadform without requiring orifices and other passages that are required for orificed air bearings. Furthermore, while the preferred threadforms have square or more precisely, rectangular threads, that is, threadforms of the leadscrew and the nut which have uniform cross sections, that is, the axial thickness at the root of each tooth substantially equals the thickness at the peak threads, other thread shapes can be employed.

The leadscrew-nut system shown herein, with high, controlled fluid pressure between the threads of the leadscrew and the nut, results in high axial stiffness of the system with substantially zero stiffness in yaw, pitch, rotation and radial motion while inhibiting mechanical contact between the cooperative threads, thereby, in an operative system, to maintain the linear movement of the nut parallel to the leadscrew axis.

Figure 8:
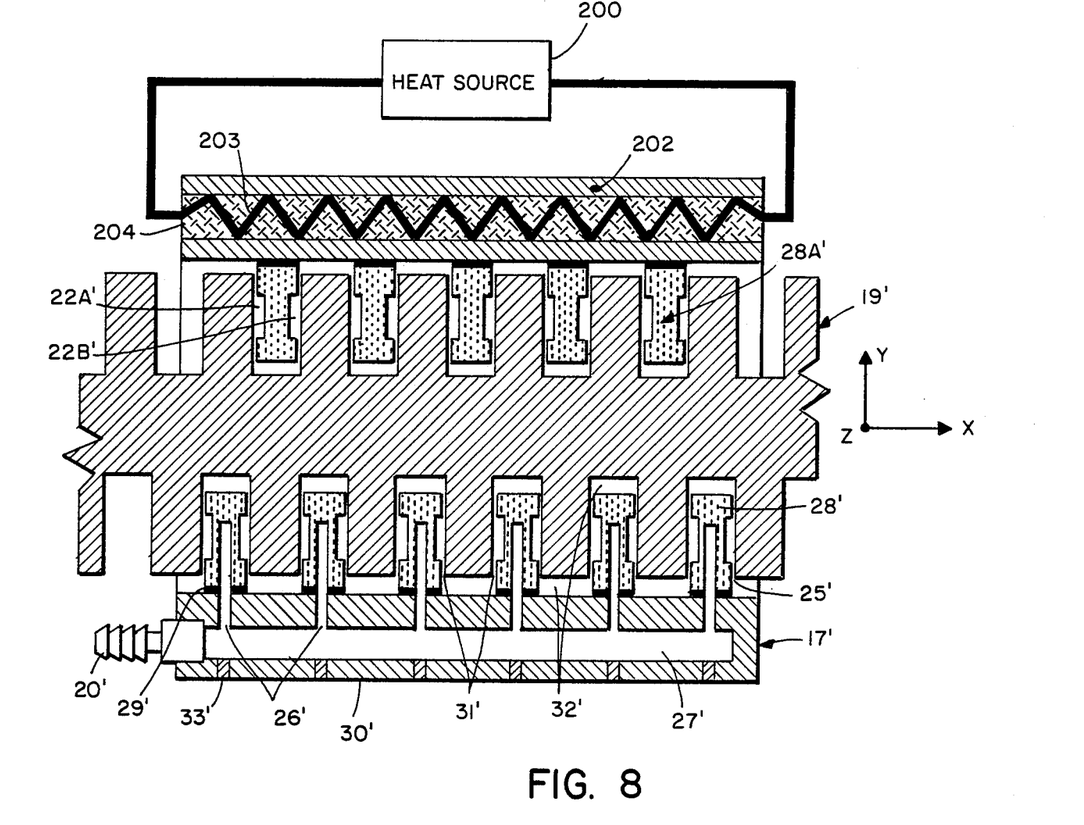
FIG. 8 shows, partly diagrammatic in form, a modification of the structure in FIG. 2.

FIG. 8 shows a structure similar to FIG. 2, but with a few differences. In Fig. 8 the inner core labeled 28A′, consisting of a special threadform 28′, formed of a porous material, allows the proper air-flow rates to occur between the leadscrew threadform and the nut threadform without requiring orifices, as are usually required for orificial bearings. Passages 26′ introduce air to the interior of the porous media. Other parts of the structure (primed numbers) correspond to the orificial nut; etc., in FIG. 2. A heat source 200 heats the air or other fluid entering the nut using coils 203 imbedded in the nut 17: with heat conductive epoxy 204 to maintain constant nut temperature in the presence of expanding fluid, which expanding fluid, if air, would otherwise tend to cool the nut and, if oil, would tend to heat the nut. The heat source is controlled by feedback from temperature-sensing devices 202 places on the nut.

Further modifications of the invention will occur to persons skilled in the art and all such modifications are deemed to be within the scope of the invention as defined by the appended claims.

What is claimed is:

1. A leadscrew and nut system wherein rotation of the leadscrew about its axis effects parallel linear movement therealong of the nut, the cooperative threadforms of the leadscrew and nut being shaped to provide for a small degree of pitch and yaw and relative radial movement of the nut out of parallelity with the leadscrew without generating or transmitting forces and moments as a result of such pitch and yaw and relative radial movement, i.e., self coupling, means for continuously supplying pressurized fluid as a continuous flow between the cooperative threads of the leadscrew and the nut, and means for controlling the fluid pressure and fluid flow continuously to provide high axial stiffness with substantially zero stiffness in yaw, pitch, rotation and radial motion while inhibiting mechanical contact between the cooperative threads, thereby to maintain the linear movement of the nut parallel to the leadscrew axis, each said cooperative threadform for the leadscrew and the nut having a depth that is equal to or greater than the width of the threadform and said depth being or the order of half the leadscrew shaft outer radius.

2. A leadscrew and nut system according to claim 1 wherein the means for controlling pressure comprises means for presenting differential fluid pressure on each side of the nut threads in response to providing high axial stiffness while not resisting a tendency to yaw, pitch, and effect relative radial motion, said means for presenting differential pressure being operable to distribute and equalize fluid pressure along the length (i.e., the helical circumference) of each respective side of the teeth of the nut threadform.

3. A leadscrew and nut system according to claim 2 wherein the differential fluid pressure presenting means comprises means for separately introducing oil on each side of the nut thread and venting the oil from the root of such nut thread to achieve said fluid flow, said nut thread being a rectangular threadform and having a large depth to width ratio.

4. A leadscrew and nut system according to claim 3 in which venting is achieved by having the radial gap between the leadscrew outside diameter and the root of the nut thread and the gap between the inside diameter of the nut and the root of the leadscrew, large compared to the axial clearance between the threads.

5. A leadscrew and nut system according to claim 4 in which groove means in the sides of the nut thread provide pressure equalizing action around the inner circumference of the nut that prevents the developement of differential fluid pressure in response to yaw, pitch, and radial motion, thereby allowing said nut to undergo small error motions along and about all axes which effectively decouples the structure the nut imposes axial motion to from the leadscrew, thereby providing high axial stiffness and force transmission without transmitting forces and moments caused by misalignment errors.

6. A leadscrew and nut system according to claim 1 in which the depth of the thread of the leadscrew is on the order of or or several times its width.

7. A leadscrew and nut system according to claim 1 in which the cooperative threadforms are rectangular threads and in which the depth of the thread of the nut is the order of half the outside radius of the leadscrew to permit efficient operation of the fluidstatic bearing between the leadscrew and the nut and minimize the number of thread turns required, thereby maximizing self coupling capability.

8. A leadscrew and nut system according to claim 1 in which the teeth forming both the leadscrew threadform and the matching nut threadforms have substantially uniform cross sections, that is, the axial thickness of the root of each tooth substantially equals the thickness at the peak thereof and in which the leadscrew is anchored at both ends thereof to a linearly movable slide that is supported by a bearing that allows for motion along the axis of the leadscrew.

9. A leadscrew and nut system according to claim 1 wherein the teeth forming both the leadscrew threadform and the nut threadform have a large depth-to-width ratio whereby the nut is floated to damp out mechanical noise.

10. A leadscrew and nut system according to claim 9 in which said depth-to width ratio is such that the depth of each thread forming the teeth forming both the leadscrew threadform and the nut threadform is several times its width.

11. A leadscrew and nut system according to claim 9 in which the threads forming both the leadscrew and the nut have substantially uniform cross sections and in which friction is substantially eliminated and there is substantially 100% power conversion efficiency, such that the high pressure fluid at said interface preloads the nut to eliminate backlash or wear between the leadscrew and the nut, such that only forces along an axis parallel to the axis of the leadscrew are transmitted by the nut.

12. In a system that includes a linearly movable carriage, a mechanism to convert rotary motion from a leadscrew to linear motion of a nut by way of special threadforms which utilize a fluid as an interface between the special threadform of the leadscrew and the special threadform of the nut, said mechanism comprising:

a leadscrew with a threadform formed into its length;

a nut mechanically secured to the carriage, said nut being configured to mate with said leadscrew and being operable to convert rotary power provided by said leadscrew to linear power for moving said carriage with a very high efficiency and zero backlash or wear between said leadscrew and said nut, said nut having a threadform formed into said nut that is adapted to mate with the threadform of said leadscrew, axial clearance being provided between the nut threadform and the leadscrew threadform to allow a cushion of a high pressure fluid to act as an interface between the threadforms, and clearance also allowing for rocking motion of said nut about said leadscrew by an amount equal to the expected angular misalignment of said leadscrew and said linearly movable carriage, the threadform being ground into said nut and being adapted to mate with the threadform of said leadscrew and to provide additional radial clearance between the nut threadform and the leadscrew threadform to allow for radial motion of said nut about said leadscrew by an amount equal to the expected linear misalignment of said leadscrew with said linearly movable carriage without providing a resistive force or allowing contact to occur between the threadforms of said nut and leadscrew, and to allow high pressure fluid to escape from said clearence between the juxtaposed threadforms to easily exit from the region between said nut and said leadscrew, even near the axial center of said nut, shallow independent grooves being formed into each side of said nut threadform to distriute and equalize air pressure along the radial length at each respective side of said nut threadform, said nut threadform having orifices disposed along the length of said grooves, said orifices being oriented axially and providing high pressure air to said shallow independent grooves, said nut further having air supply holes extending radially from a larger air plenum to intersect with said axially oriented orifice holes to supply high pressure air to said orifices and radially aligned exhaust holes formed about the circumference of said nut to help exhaust air from said radial clearance regions.

13. The mechanism of claim 12 in which the liquid fuel is an oil.

14. The mechanism of claim 12 in which the juxtaposed threadforms are fommed of a porous material that allows the proper air flow rates to occur between said leadscrew threadform and said nut threadform free of orifices and other passages as are usually required for orificed air bearings.

15. For use in a system that includes a linearly movable carriage or the like, a mechanism to convert rotary motion of a leadscrew to linear motion of a nut, said mechanism comprising:

a leadscrew having a special threadform or leadscrew threadform; and a nut to receive the leadscrew, having a special threadform or nut threadfoum that matches the leadscrew threadform with a pressurized fluid interface therebetween, there being both axial clearance and radial clearance sufficient to accomodate angular and lateral misalignment between the leadscrew and the movable carriage, said nut being secured to the carriage, the leadscrew threadform and the nut threadform serving to enable the nut to act as a coupling between itself and the carriage or the like such that only forces along an axis parallel to the axis of the leadscrew are transmitted from the nut to the carriage or the like and potential misalignment forces and moments orthogonal to the leadscrew axis are not generated or transmitted;

at least one of the leadscrew threadform and the nut threadform having means to equalize fluid pressure therealong;

said means to equalize pressure comprising grooves that extend radially of the particular threadform in which they are formed and along a helical path that extends axially along the particular threadform;

said mechanism having electric resistance heaters to heat the fluid entering the nut to maintain constant nut temperature in the presence of the expanding fluid in the nut, which expanding tends to cool the nut, said electric resistance heaters being controlled by feedback from temperature sensing devices placed on the nut.

16. In a system that includes a linearly movable carriage, a mechanism to convert rotary motion from a leadscrew to linear motion of a nut by way of special threadforms which utilize a fluid as an interface between the special threadforms of the leadscrew and the special threadforms of the nut, said mechanism comprising:

a leadscrew with a threadform formed into it length;

a nut mechanically secured to a linearly movable carriage, said nut being configured to mate with said leadscrew and being operable to convert rotary power provided by said leadscrew to linear power for moving said carriage with a very high efficiency and zero backlash or wear between said leadscrew and said nut, said nut having a threadform into said nut that is adapted to mate with the threadform of said leadscrew, axial clearance being provided between the nut threadform and the leadscrew threadform to allow a cushion of a high pressure fluid to act as an interface between the threadforms, said clearance also allowing for limited (on the order of a tenth of a degree) yaw and pitch motion of said nut about said leadscrew by an amount equal to the expected angular misalignment of said leadscrew and said linearly movable carriage, the threadform being formed to mate with the nut threadform of said leadscrew and providing radial clearance between the nut threadform and the leadscrew threadform to allow for radial motion of said nut about said leadscrew by an amount equal to the expected linear misalignment of said leadscrew with said linearly movable carriage without providing a resistive force or allowing contact to occur between the threadforms of said nut and leadscrew, and to allow high pressure fluid to escape from said clearance between the juxtaposed threadforms to easily exit from the region between said nut and said leadscrew, even near the axial center of said nut, wherein shallow independent grooves are formed into each side of said nut threadform to distribute and equalize fluid pressure along the radial length at each respective side of said nut threadform, said nut threadform having one or more orifices or other fluid flow control devices disposed along the length of said grooves, said orifice or other fluid flow being oriented axially and providing high pressure fluid to said shallow independent grooves, said nut further having fluid supply holes extending radially from a larger plenum to intersect with said axially oriented orifice holes to supply high pressure fluid to said orifices or other fluid flow control devices and radially aligned exhaust holes formed about the circumference of said nut to help exhaust fluid from said radial clearance regions.

17. For use in a system that includes a linearly movable carriage or the like, a mechanism to convert rotary motion of a leadscrew to linear motion of a nut, said mechanism comprising;

a leadscrew having a special threadform or leadscrew threadform (24); and a nut to receive the leadscrew, having a special threadform or nut threadform (28) that matches the leadscrew threadform with a pressurized fluid interface therebetween, there being both axial clearance and radial clearance sufficient to accommodate angular and lateral misalignment between the leadscrew and the movable carriage, said nut being secured to the carriage, said nut threadform containing shallow independent grooves along both sides of the nut threadform to distribute and equalize fluid axially along the nut, while allowing the nut to undergo limited pitch or yaw motion without restraint;

the teeth forming both the leadscrew threadform and the matching nut threadform having rectangular cross sections, that is, the axial thickness at the root of each tooth substantially equaling the axial thickness at the peak thereof;

and in which the root diameter (40) of the leadscrew threadform (24) is less than the peak diameter (41) of the nut threadform (28), in which the maximum outside diameter (42) of the leadscrew threadform (24) is less than the maximum inside diameter (43) of the nut threadform (28), the differences in diameters being on the order of 0.1-0.2 of the height of the thread.

18. A method of converting rotary motion to linear motion in a system, which method comprises:

providing a leadscrew with a threadform formed into its outer surface along its length dimension;

providing a nut to receive the leadscrew, which nut has a threadformed into its inner surface along its axial direction, the threadform of the nut mating with the threadform of the leadscrew, axial clearance being provided between the threadform of the nut, or nut threadform, and the threadform of the leadscrew, or leadscrew threadform, to permit a high pressure fluid to act as an interface between the two threadforms, which clearance also allows for rocking motion of the nut about the leadscrew by an amount sufficient to accomodate angular misalignment of the leadscrew within the system, the threadform of the leadscrew and the threadform of the nut serving to enable the nut to act as a coupling between itself and a system part to which said linear motion is imparted such that only forces along an axis parallel to the leadscrew axis are transmitted from the leadscrew to the part, wherein the fluid is air and that further includes providing shallow independent grooves along both sides of the helical thread in the nut threadform to distribute and equalize air axially along the nut, providing air orifices along the length of the grooves to permit introduction of high pressure air thereto, and providing exhaust holes aligned radially to help exhaust air from the region of clearance between the nut threadform and the leadscrew threadform.

19. A method of converting rotary motion to linear motion in a system, which method comprises:

providing a leadscrew with threadform formed into its outer surface along its length dimension;

providing a nut to receive the leadscrew, which nut has a threadform formed into its inner surface along its axial direction, the threadform of the nut mating with the threadform of the leadscrew, axial clearance being provided between the threadform of the nut, or nut threadform, and the threadform of the leadscrew, or leadscrew threadform, to permit a high pressure fluid to act as an interface between the two threadforms, which clearance also allows for motion of the nut about the leadscrew by an amount sufficient to accommodate angular misalignment of the leadscrew within the system;

providing shallow independent grooves along both sides of the helical thread in the nut threadform to distribute and equalize fluid axially along the nut, said grooves being capped at the ends thereof;

providing one or more orifices or other fluid flow control devices along the length of the grooves to permit introduction of high pressure fluid thereto; and providing exhaust holes to exhaust fluid from the region of clearance between the nut threadform and the leadscrew threadform.

* * * * *